United States Patent
Caillaud et al.

(10) Patent No.: US 8,108,186 B2
(45) Date of Patent: Jan. 31, 2012

(54) DISTANCE-JUMP-TOLERANT FLIGHT MANAGEMENT SYSTEM

(75) Inventors: Christophe Caillaud, Blagnac (FR); Guy Deker, Cugnaux (FR); François Hoofd, Toulouse (FR)

(73) Assignee: Thales (FR)

( * ) Notice: Subject to any disclaimer, the term of this patent is extended or adjusted under 35 U.S.C. 154(b) by 938 days.

(21) Appl. No.: 11/866,618

(22) Filed: Oct. 3, 2007

(65) Prior Publication Data

US 2008/0086243 A1 Apr. 10, 2008

(30) Foreign Application Priority Data

Oct. 3, 2006 (FR) ...................................... 06 08652

(51) Int. Cl.
*G01C 23/00* (2006.01)
(52) U.S. Cl. ................ 703/3; 701/3; 701/205; 701/206; 701/209; 701/221; 342/357.59; 342/357.65; 342/29; 244/3.2; 244/193
(58) Field of Classification Search .............. 701/3, 214, 701/205, 206, 221
See application file for complete search history.

(56) References Cited

U.S. PATENT DOCUMENTS

| | | | | |
|---|---|---|---|---|
| 4,783,744 A * | 11/1988 | Yueh | ............................. | 701/221 |
| 5,566,074 A * | 10/1996 | Hammer | ...................... | 701/301 |
| 5,646,854 A * | 7/1997 | Bevan | ........................... | 701/206 |
| 6,345,232 B1 * | 2/2002 | Lynch et al. | ................... | 701/214 |
| 7,650,232 B1 * | 1/2010 | Paielli | .......................... | 701/205 |
| 2008/0086243 A1 * | 4/2008 | Caillaud et al. | ................... | 701/3 |

FOREIGN PATENT DOCUMENTS

EP 1538504 6/2005

* cited by examiner

*Primary Examiner* — Hussein Elchanti
*Assistant Examiner* — Redhwan K Mawari
(74) *Attorney, Agent, or Firm* — Lowe Hauptman Ham & Berner, LLP

(57) ABSTRACT

Flight management systems can behave erratically when the distance measurements on which they are based are subject to value jumps because they liken these value jumps to movements of the aircraft performed at speeds exceeding the performance levels of the aircraft for which they were designed. To avoid this, the proposed flight management system uses a filter to spread the distance value jumps in time, over periods of the order of those needed for the aircraft to come through the distance differences that they represent. This filter replaces a value jump with a ramp making up the difference and corresponding to a movement that remains within the performance scope of the aircraft.

10 Claims, 5 Drawing Sheets

DISTANCE-JUMP-TOLERANT FLIGHT MANAGEMENT SYSTEM

RELATED APPLICATIONS

The present application is based on, and claims priority from, France Application Number 06 08652, filed Oct. 3, 2006, the disclosure of which is hereby incorporated by reference herein in its entirety.

FIELD OF THE INVENTION

The invention relates generally to the aeronautical field. More particularly, the invention relates to flight management systems responsible for path monitoring on board aircraft.

BACKGROUND OF THE INVENTION

Flight management systems provide assistance in following or ensure the automatic following of a route defined in the flight plan by a succession of geographic points called "waypoints", which are associated with flight constraints and mark turns (turning points), vertical transitions or changes of guidance instructions. For this, they generate, at the start of a mission, a flyable path that follows the route logged in the flight plan and modifies it as necessary during the mission to take account of environmental conditions (weather, wind, etc.) that might have changed.

To determine the moments when the vertical and lateral transitions must be executed, and the moments when guidance instructions change or when monitoring or action messages should be displayed, the flight management systems need to know at all times the position of the aircraft relative to the points marking the vertical or lateral transitions, or changes of guidance instruction along the flyable path that has been generated. For this, they use comparisons of curvilinear distances, measured from a particular point: the destination of the aircraft or a next waypoint to be reached, following the flyable path generated previously.

The curvilinear distances from which the flight management systems get their bearings are subject to value jumps with various causes: adjustments to the path, made en route, to take account of changes of environmental conditions, unavailability and instability of the measurements (geographic location, altitude, speed, etc.) originating from flight instruments of the aircraft from which they are generated, and so on.

In practice, the new inclusion of an environmental condition unpredicted when creating the flight plan, such as a change in the direction or the force of the wind, can be reflected in a change of path (more or less tight turn at a turning point) affecting the distances to be travelled.

Similarly, in periods when the measurements needed to generate the curvilinear distances are unavailable, the flight management systems can temporarily replace them with estimates based on the elapsed time and the latest valid measurements. When measurements become available again, value jumps can occur when replacing the estimate with the value actually computed from current measurements that are once again valid.

Finally, the instabilities affecting the measurements supplied by the flight instruments, in particular on unexpected changes of sensor or measurement method (replacing a position measurement from a satellite positioning receiver with that from an uncorrected inertial unit or vice-versa, replacing an altimetric measurement from a baro-altimeter with that from a radio-altimeter, or vice-versa, and so on) are reflected in value jumps on the curvilinear distances that are deduced from them.

These value jumps affecting the curvilinear distances are seen by the flight management systems as the consequences of movements of the aircraft made at speeds that depart from the scope of the performance levels of the aircraft for which they were designed. In the presence of these, the flight management systems temporarily behave erratically which can be reflected in the detection of false violations of the flight constraints, for example minimum altitude constraint approaching a landing field, leading to an erroneous perception of the context leading the crew to make pointless or even dangerous manoeuvres.

SUMMARY OF THE INVENTION

An object of the present the invention is to remedy the abovementioned drawback of a flight management system, by spreading the curvilinear distance jumps that it generates, over a period of the order of the travel time needed for the aircraft to come through the corresponding distance difference, in order for these distance jumps to be able to be interpreted and processed by the flight management system in the same way as the changes in position resulting from the movements of the aircraft.

The present invention is directed to a flight management system for aircraft, comprising computation means periodically generating a curvilinear distance between the current position of the aircraft deduced from data delivered by flight instruments and locating instruments, and a geographic position to be reached following a logged path, and a filter for smoothing jumps in curvilinear distance value generated by the curvilinear distance computation means, breaking down the value jumps into elementary levels which are dependent on the current speed of the aircraft and added one by one in the course of periodic distance updates.

Advantageously, the elementary level is taken to be equal to the distance that can be travelled at the current speed of the aircraft over the duration of an update period.

Advantageously, when the flight management system comprises means of computing the direct distance between the current position of the aircraft and a geographic position to be reached and this direct distance is greater than a hundred nautical miles, the elementary level is taken to be equal to the distance that can be travelled over the duration of an update period $\Delta T$ at a speed taken to be equal to the gradient of the trend function of the direct distance.

Advantageously, the smoothing filter comprises disabling means rendering it transparent while the difference between two curvilinear distance values delivered successively by the curvilinear distance computation means remains less than or equal to a threshold.

Advantageously, the smoothing filter comprises disabling means rendering it transparent while the difference between two curvilinear distance values delivered successively by the curvilinear distance computation means remains less than or equal to a threshold dependent on the gradient of the trend function of the curvilinear distance.

Advantageously, the smoothing filter comprises disabling means rendering it transparent while the difference between two curvilinear distance values delivered successively by the curvilinear distance computation means remains less than or equal to a threshold taken to be equal to 1.5 times the gradient of the trend function of the curvilinear distance.

Advantageously, the flight management system comprises, at the output of the curvilinear distance computation means, two smoothing filters placed in parallel, with different update periods, the smoothing filter with the shorter update period supplying a curvilinear distance value used by the flight management system for guidance in the horizontal plane and the smoothing filter with the longer update period supplying a curvilinear distance value used by the flight management system for guidance in the vertical plane.

Advantageously, when the flight management system comprises, at the output of the curvilinear distance computation means, two smoothing filters placed in parallel, used by the flight management system, one for guidance in the horizontal plane and the other for guidance in the vertical plane, the smoothing filter used by the flight management system for guidance in the horizontal plane has an update period of about one second.

Advantageously, when the flight management system comprises, at the output of the curvilinear distance computation means, two smoothing filters placed in parallel, used by the flight management system, one for guidance in the horizontal plane and the other for guidance in the vertical plane, the smoothing filter used by the flight management system for guidance in the vertical plane has an update period of about ten seconds.

Advantageously, the flight management system comprises means of computing the direct distance between the current position of the aircraft and a geographic position to be reached and conditions the display of messages linked to the distance of the geographic position to be reached and to the way the direct distance changes.

BRIEF DESCRIPTION OF THE DRAWINGS

Other characteristics and advantages of the invention will become apparent from the description below of an embodiment given by way of example.

This description will be given in light of the drawing in which.

DETAILED DESCRIPTION OF PREFERRED EMBODIMENT

Figure 1:
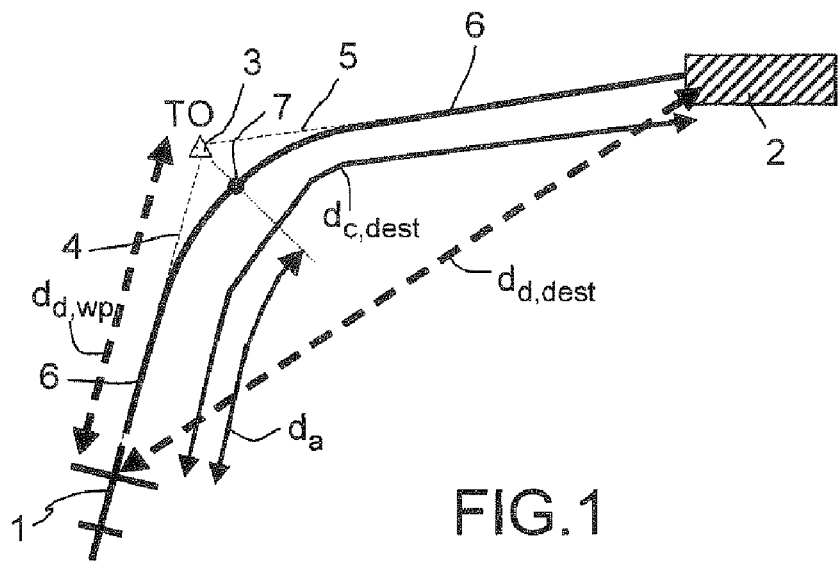
FIG. 1 is a diagram illustrating, in the horizontal plane, the definitions of different kinds of distances used by a flight management system.

FIG. 1 gives an example of the situation, in the horizontal plane, of an aircraft 1 following a flight plan, the route of which leads to a landing strip 2, passing through a turning point TO 3.

The aircraft 1 is travelling the penultimate segment 4 leading to the turning point TO 3 of the route logged in its flight plan. It still has to complete the final part of this penultimate segment 4 and the final segment 5 which will take it from the turning point TO 3 to the landing strip 2 which is its final destination. To follow this route, its flight management system has created a flyable lateral path 6, with a minimum-radius turn imposed taking into account, among other things, the manoeuvrability of the aircraft, best respecting the route segments 4, 5 remaining to be travelled and the flight constraints associated with them.

To assist in following or to automatically follow the flyable path 6 generated from the route logged in the flight plan, the flight management system needs to know how the aircraft 1 is progressing along this flyable path 6. To this end, it uses various types of distances, including:

the "direct distance to destination" $D_{d,dest}$, which is the shortest orthodromic distance between the aircraft 1 and its destination, in this case the final alignment point on the final approach to the landing strip 2, the "direct distance to waypoint" $d_{d,wp}$, which is the shortest orthodromic distance between the aircraft 1 and the next waypoint, in this case the turning point TO 3, the "along path distance to destination" $D_{c,dest}$, which is the curvilinear distance remaining to be travelled over the flyable path to arrive at the destination 2, and the "active distance" $D_a$, which is the curvilinear distance remaining to be travelled on the flyable path to reach a sequencing point 7 corresponding to the projection of the next waypoint 3 on the flyable path 6.

In practice, a flight management system takes account of the scale of the lateral error in following the flyable path. If this error is great, for example greater than an authorized corridor width often called "required navigation performance" RNP, the flight management system complements the flyable path generated initially with a rejoining segment, which affects its estimations of the various distances. If this error is small, for example less than an authorized corridor width, the flight management system leaves the flyable path initially generated unchanged and estimates the various distances from the current position of the aircraft projected onto this path.

Figure 2:
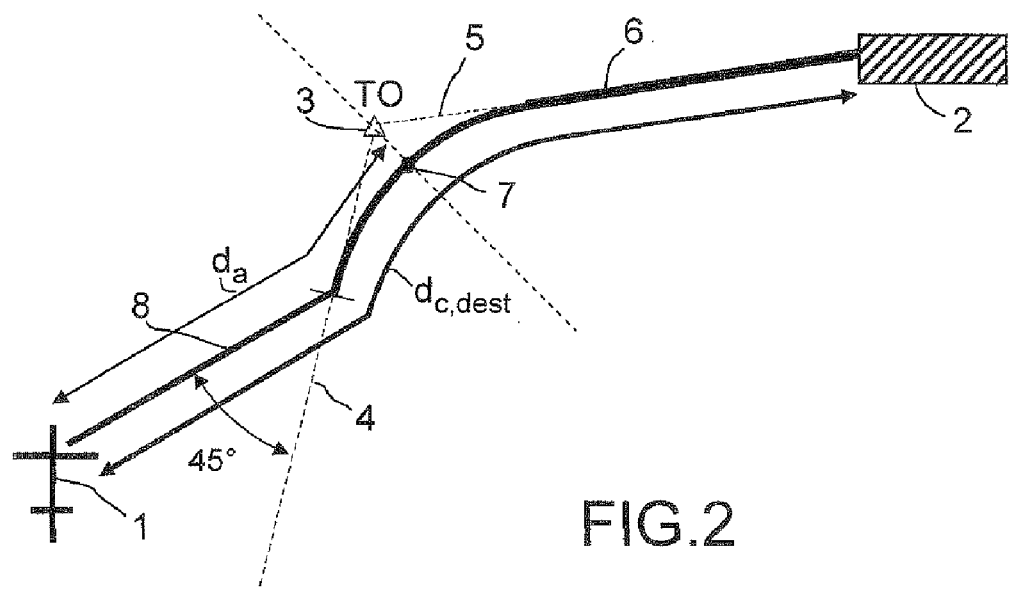
FIGS. 2 and 3 are diagrams illustrating, in the horizontal plane, an exemplary method used by a flight management system to rejoin a logged flyable lateral path.

FIG. 2 gives an example of a situation where the aircraft 1 following the flyable path 6 of FIG. 1 is located to the left of this flyable path 6, with a wide lateral error, and where its flight management system complements the flyable path with a segment 8 for rejoining the penultimate segment 4 of the route logged in its flight plan, observing a defined capture angle, for example 45°. This rejoining segment 8 prolongs the flyable path generated initially and, therefore, the active distance $d_a$ and the along path distance to destination $d_{c,dest}$ measured by the flight management system.

Figure 3:
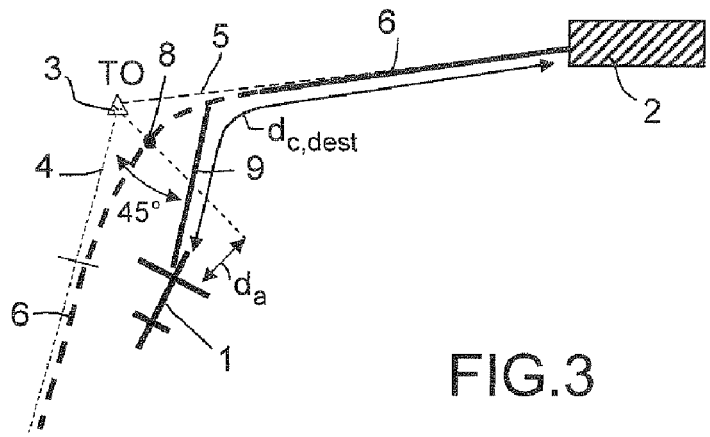

FIG. 3 gives an example of a situation where the aircraft 1 following the flyable path 6 of FIG. 1 is located to the right of this flyable path 6, with a wide lateral error and where its flight management system complements the flyable path with a segment 9 for rejoining the final segment 5 of the route logged in its flight plan, observing a capture angle of 45° for example. This rejoining segment 8 short circuits a part of the flyable path generated initially and therefore, by its presence, shortens the active distance da and the along path distance to destination $d_{c,dest}$ measured by the flight management system.

Each addition to the flyable path made by a flight management system for convergence with the route logged in the flight plan affects the curvilinear distances which can then be subject to value jumps.

Figure 4:
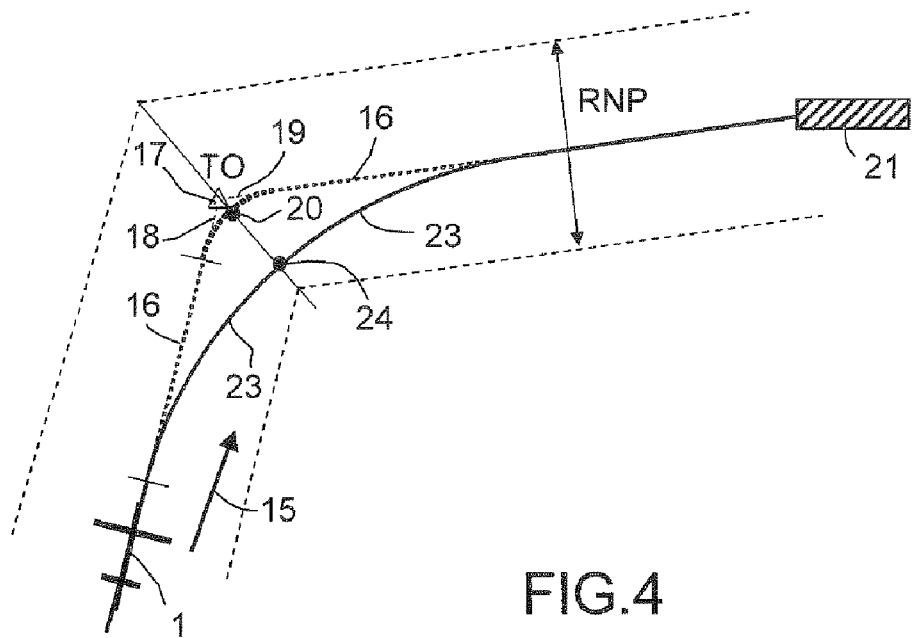
FIGS. 4 and 5 are diagrams illustrating, in the horizontal and vertical planes, the impact of a curvilinear distance value jump in the case of a change of path during a mission to take into account a fair wind disregarded on departure.
Figure 5:
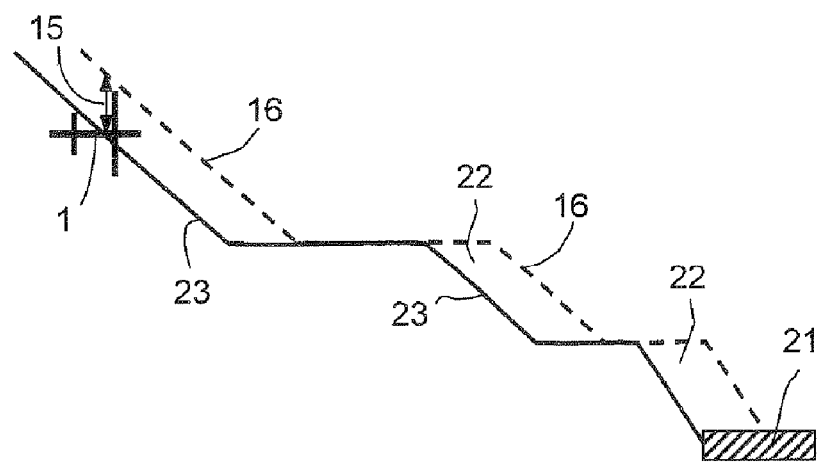

FIGS. 4 and 5 illustrate a flight situation in which the recognition of a fair wind 15 not forecast when preparing the flight plan leads the flight management system to modify the flyable path 16 generated initially, leading to a shortening of the distances to be travelled, resulting in false alarms concerning the violation of minimum altitude floors.

When preparing the flight plan, the flight management system generated a flyable path 16 which closely follows the segments 18, 19 of a route logged in the flight plan because no wind was forecast in the vicinity of the turning point TO 17. As shown in FIGS. 4 and 5, this initial flyable path 16 observes flight constraints included in the flight plan, both laterally, required navigation performance RNP, and vertically, altitude minima to be observed when descending on the approach to a landing field 21. It has a sequencing point 20 very close to the turning point TO 17.

To take account of the fair wind 15 and compensate for the drift that it induces, the flight management system modifies the flyable path generated initially 16, to a flyable path 23 with more open turn, remaining within the limitations of the required navigation performance RNP but with a sequencing point 24 clearly more distant than the initial sequencing point 20. By cutting the turn at the turning point TO 17, the distance to be travelled is shortened.

For assistance in following or to follow the flyable path, the flight management system marks the start of the turn to be made and the altitude minima 22 to be observed during the descent approaching the runway 21, by their along path distances to destination. The updates of these along path distances to destination, which are made at a frequency that is compatible with the movements of the aircraft, can be taken unawares by curvilinear distance value jumps resulting from a modification of the flyable path. In the case of FIGS. 4 and 5 where the curvilinear distances are sharply reduced, a delay in the updates of the flight constraint start reference curvilinear distances relative to the updates of the curvilinear distances of the aircraft means that the flight management system wrongly advances the starts and ends of descent levels in the new flyable path. This advancing of the starts and ends of descent levels during a transitional period following a modification of the flyable path and preceding the updates of the reference curvilinear distances can result in the fleeting generation of false alarms or minimum or constraint altitude violation alarms which reduce the confidence of the crew in the flight management system.

To avoid this disturbing phenomenon, it is proposed to filter the current distance values generated by a flight management system to smooth their value jumps and spread them, for example over a period of the order of the travel time needed for the aircraft to come through the distance differences to which they correspond.

Figure 6:
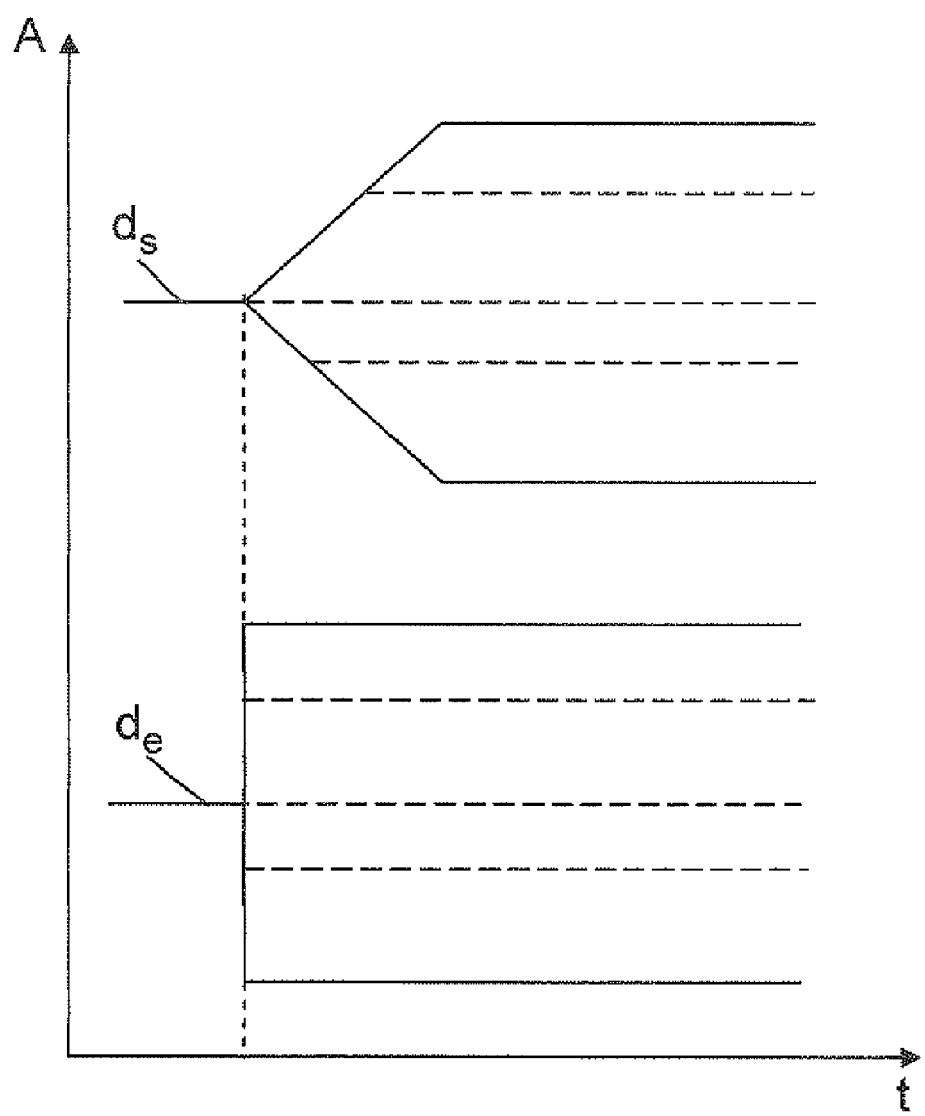
FIG. 6 is a diagram illustrating the response of a smoothing filter according to the invention.

As shown in FIG. 6, a smoothing filter is used that responds to an input signal $d_e$ with positive or negative level with an output signal $d_s$ in the form of a ramp of the same sign and of the same amplitude. The ramp has a slope, the tangent of which corresponds to a speed chosen from the performance range of the aircraft, for example the current speed of the aircraft.

Figure 7:
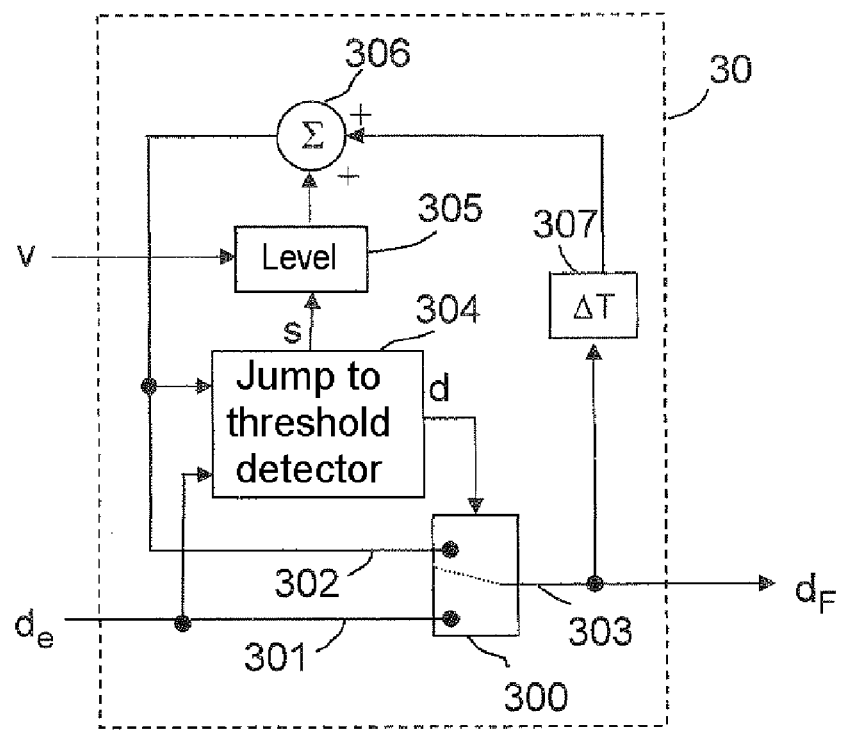
FIG. 7 is a theoretical diagram of a digital smoothing filter according to the invention.

FIG. 7 shows an example of a digital implementation of the smoothing filter designed to work on successive distance signal samples. In this example, the smoothing filter 30 comprises an inverter 300 with two inputs, one 301 constituting the input of the smoothing filter 30 and the other 302 used as a loopback input, and an output 303 constituting the output of the smoothing filter 30. A value jump detector with threshold 304 measures the sign and the amplitude of the difference existing between the two signals present at the inputs 301, 302 of the inverter 300 and controls the inverter 300 so that it allows either the input signal of the filter to pass if the absolute value of the measured difference is less than or equal to a decision threshold, or the loopback signal to pass if the absolute value of the measured difference is greater than the decision threshold. The detector 304 supplies, in addition to the signal c controlling the inverter 300, a difference sign signal s to an increment or level generator 305. An adder 306 applies to the loopback input 302 of the inverter 300, the sum of the signal available at the output of the smoothing filter 30, delayed by a sampling period ΔT by a delay circuit 307, and the signal available at the output of the increment generator 305.

The decision threshold of the detector 304 needs to allow for the detection of violent distance value jumps that cannot be explained simply by the movement of the aircraft, that is, greater as an absolute value than the distance that can be travelled by the aircraft over a sampling period. It can be taken, for example, to be equal to 1.5 times the gradient of the distance value processed.

The value of the increment or of the level delivered by the generator 305 can be taken to be equal to the distance that can be travelled by the aircraft with its speed at the time, over the duration of a sampling period, assigned the sign of the difference s delivered by the detector 304. The generator 305 then receives on one input the current speed v of the aircraft supplied by a flight instrument.

In the absence of a value jump, the smoothing filter 30 is transparent. In practice, the differences encountered between the successive distance value samples remain less than the decision threshold; the detector 304 is not triggered and controls the inverter 300 to directly link the input and the output of the smoothing filter 30.

In the presence of a significant value jump, the smoothing filter spreads it in time. In practice, with the value jump, the difference between two successive distance samples is sharply increased above the decision threshold of the detector 304, causing it to be triggered and the inverter 300 to be controlled, to connect the output of the smoothing filter 30 with the loopback input 302 to limit the difference taken into account, to the value of an increment or level. As long as the difference taken into account is insufficient to make up the value jump, the detector 304 remains triggered causing other increments to be taken into account at the rate of occurrence of the samples. When the accumulation of the increments is sufficient to bring the difference below the decision threshold, the detector 304 drops back and the smoothing filter 30 becomes transparent once again. The gradual accumulation of the increments produces, at the output of the smoothing filter 30, a ramp which replaces the value jump level. This ramp simulates a natural movement of the aircraft within the normal operating constraints of a flight management system for which the problems of updating the reference curvilinear distances are necessarily resolved.

Figure 8:
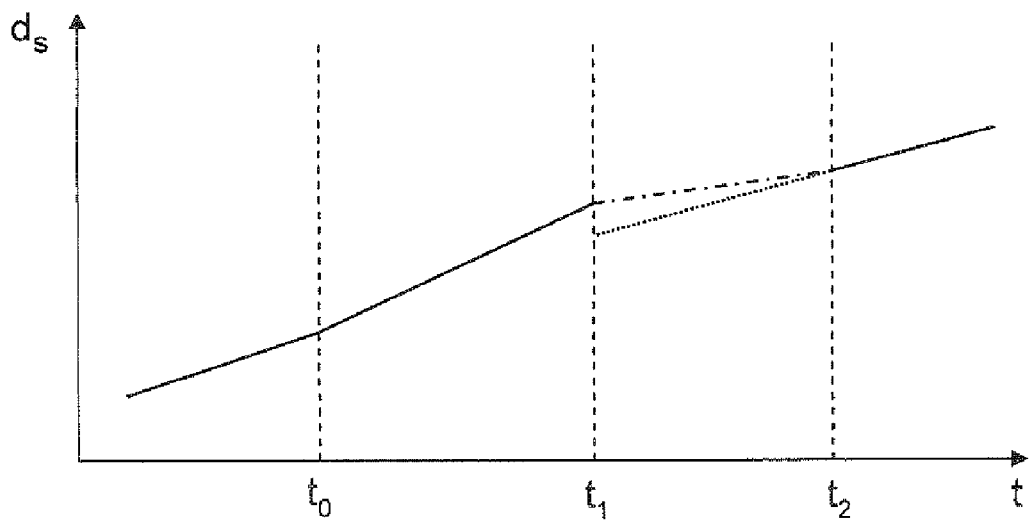
FIG. 8 is a diagram showing the typical result of the digital smoothing filter.

The diagram of FIG. 8 illustrates the behaviour of the output signal $d_s$ of a smoothing filter in the presence of a distance measurement input signal affected by a value jump due to a return to availability of the distance measurement after a period of unavailability when it was replaced by an estimation that became increasingly erroneous over time.

Until the time $t_0$, the distance signal applied to the input of the smoothing filter is based on valid measurements delivered by the flight instruments. From the time $t_0$ and until the time $t_1$, one or more measurements necessary for the generation of the distance signal, for example the GPS position, become unavailable. To overcome this omission, the distance signal is estimated from the speed of the aircraft, taking into account the elapsed time since the last valid measurements, but this estimation becomes increasingly inaccurate and drifts over time. From the instant $t_1$, all the measurements needed to generate the distance signal become available once again, which makes it possible to substitute the distance signal for its estimation. This substitution results in a value jump dependent on the error affecting the estimation and progressively softened by the smoothing filter until the time $t_2$ when its output signal returns to the distance value based on valid measurements.

The smoothing filtering applied to a distance signal to soften the value jumps may differ according to the conditions of use of the distance by the flight management system. Thus, two smoothing filters in parallel can be provided, one to follow the horizontal profile of the flyable path, the other to follow the vertical profile of the flyable path in order to take account of the differences in responsiveness of the flight management system, themselves linked to the manoeuvrability differences of an aircraft in the horizontal and vertical planes. The smoothing filter for following the horizontal profile then has an update period of about one second whereas the smoothing filter for following the vertical profile has a greater update period, of about ten seconds because of the greater inertia of the aircraft in the vertical plane.

When the along path distance to destination of the aircraft is great, greater than a hundred nautical miles, its gradient can be used in place of the speed of the aircraft to determine the modulus of the elementary increment or level of a ramp of a smoothing filter to follow a vertical profile.

Figure 9:
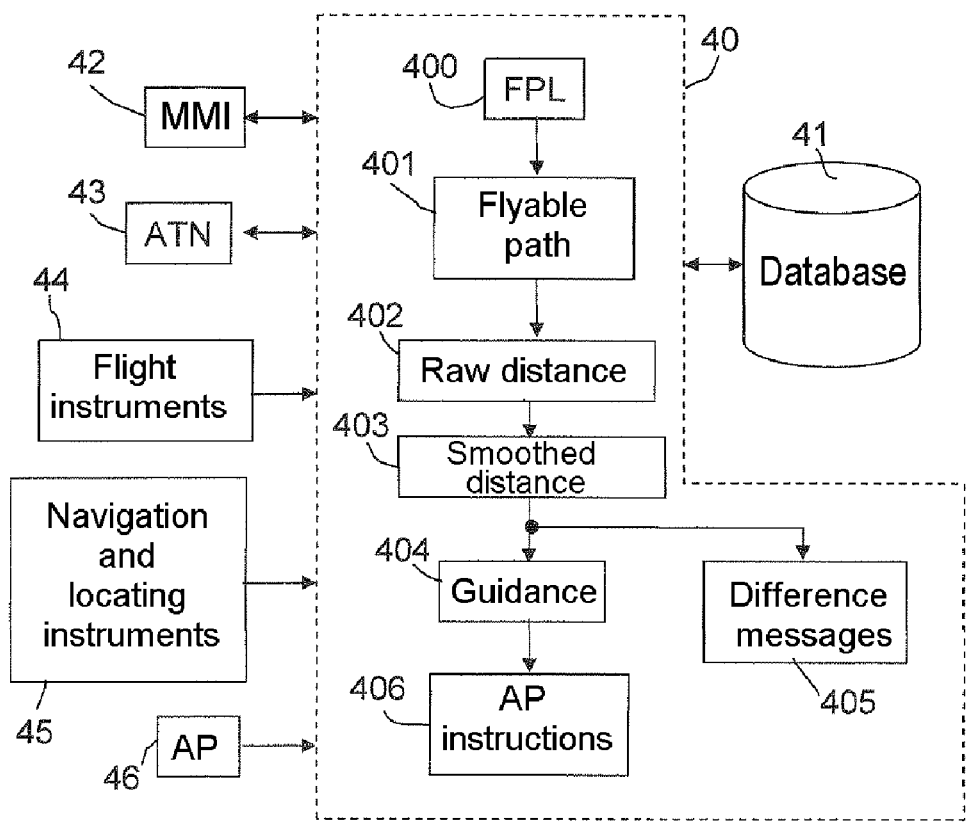
FIG. 9 is a theoretical diagram of a flight management system according to the invention.

FIG. 9 illustrates the layout of a flight management system 40 in its environment on board an aircraft, and the organization of its tasks. The flight management system 40 begins with a flight plan parameterizing task 400 conducted using a navigation database 41 on board or accessible from the aircraft and under the control of the crew of the aircraft working through the intermediary of a man-machine interface 42, for example an MCDU (Multipurpose Control Display Unit) or an FCU (Flight Control Unit), or under the control of personnel external to the aircraft via an ATN (Aeronautical Telecommunications Network) data transmission system 43. It continues with a task 401 to generate a logged flyable path making it possible to follow the route set out in the flight plan, then with a task to follow or assist in following the flyable path generated during which it performs:
- raw distance computations 402 based on measurements supplied by flight instruments 44 and by navigation and locating instruments 45,
- a smoothing 403 of the computed distances making it possible to spread over time the value jumps that occur as a result of modifications of the flyable path made during the flight, fleeting unavailabilities of measurements or measurement instabilities occurring in the distance computations,
- determination of the path-following differences by checking the match between the information delivered by the flight instruments 44 and the navigation instruments 45 with a nominal following of the logged flyable path, and
- in the case of assistance in following the flyable path, generating 404 messages indicating difference from the logged flyable path, communicated to the crew of the aircraft via the man-machine interface MMI 42,
- in the case of automatic following of the flyable path, generation 405 of the path-following instructions intended for the automatic pilot 46.

Since the modifications of the flyable path made during the flight by the flight management system to rejoin the route logged in the flight plan following differences that have occurred because of unforeseen changes to the flight conditions, causing the greatest value jumps, have significantly less influence on the direct distance than on the curvilinear distance, the flight management system conditions the display of the messages linked to the distance from a point or from the destination, to the trend of the direct distance rather than to the trend of the curvilinear distance.

The invention claimed is:

1. A flight management system for aircraft, comprising:
computation means periodically generating a curvilinear distance $d_a$, $d_{c,dest}$ between a current position of an aircraft deduced from data delivered by flight instruments and locating instruments, and a predetermined geographic position to be reached following a predetermined logged path, and
a filter for smoothing a jump between two successive values in the curvilinear distance value ($d_a$, $d_{c,dest}$) generated by the curvilinear distance computation means, the filter adapted to generate a plurality of elementary levels, values of the elementary levels based on a current speed of the aircraft and the jump, the filter adapted to add the values of the elementary levels one by one at a corresponding update period to new values of the curvilinear distance value ($d_a$, $d_{c,dest}$) generated by the curvilinear distance computation means.

2. The system according to claim 1, wherein the elementary level is taken to be equal to a distance that the aircraft travels at the current speed of the aircraft over a duration of the update period $\Delta T$.

3. The system according to claim 1, wherein, when the flight management system comprises means of computing a direct distance $d_{d,dest}$ between the current position of the aircraft and a geographic position to be reached and the direct distance $d_{d,dest}$ is greater than a hundred nautical miles, the elementary level is taken to be equal to a distance that can be travelled over a duration of an update period $\Delta T$ at a speed taken to be equal to a gradient of a trend function of the direct distance.

4. The system according to claim 1, wherein the smoothing filter comprises disabling means rendering the smoothing filter transparent while the jump between two successive curvilinear distance values $d_a$, $d_{c,dest}$ delivered successively by the curvilinear distance computation means remains less than or equal to a threshold.

5. The system according to claim 4, wherein the threshold is dependent on a gradient of a trend function of the curvilinear distance $d_a$, $d_{c,dest}$.

6. The system according to claim 5, wherein the threshold is taken to be equal to 1.5 times the gradient of the trend function of the curvilinear distance $d_a$, $d_{c,dest}$.

7. The system according to claim 1, comprising, at an output of the curvilinear distance computation means, two smoothing filters placed in parallel, with different update periods, the smoothing filter with the shorter update period supplying a curvilinear distance value used by the flight management system for guidance in a horizontal plane and the smoothing filter with the longer update period supplying a curvilinear distance value used by the flight management system for guidance in a vertical plane.

8. The system according to claim 7, wherein the smoothing filter used by the flight management system for guidance in the horizontal plane has an update period of about one second.

9. The system according to claim 8, wherein the smoothing filter used by the flight management system for guidance in the vertical plane has an update period of about ten seconds.

10. The system according to claim 1, further comprising means of computing a direct distance ($d_{d,wp}$, $d_{d,dest}$) between the current position of the aircraft and a geographic position to be reached, means for generating messages related to the distance to the geographic position.

* * * * *